Jan. 25, 1944.  J. B. PIERCE, JR  2,339,943
FREE-FLOWING BARIUM CARBONATE AND METHOD OF MAKING SAME
Filed Feb. 29, 1940
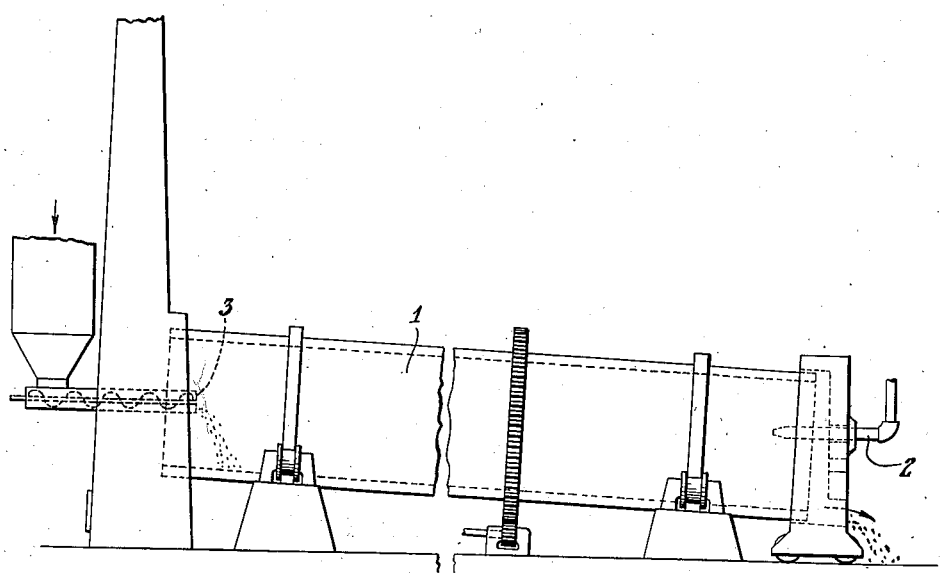
INVENTOR:
James B. Pierce, Jr.,
BY
His ATTORNEY.

Patented Jan. 25, 1944

2,339,943

UNITED STATES PATENT OFFICE 2,339,943

FREE-FLOWING BARIUM CARBONATE AND METHOD OF MAKING SAME

James B. Pierce, Jr., Charleston, W. Va.; The First National Bank of Tampa executor of said James B. Pierce, Jr., deceased Application February 29, 1940, Serial No. 321,444

7 Claims. (Cl. 23—66)

This invention relates to the treatment of precipitated barium carbonate to render the same free-flowing and thereby facilitates the dispersibility thereof throughout dry mixtures in which it is incorporated.

Many of the applications of barium carbonate especially in the enameling, carbonizing and clay products industries, require the dry admixture of the same with other dry materials. However, in all these industries, no little difficulty has been experienced in such employment of such dry barium carbonate owing to its inherent adhesiveness which tends to materially inhibit its dispersibility. Furthermore, no little difficulty has been encountered in accomplishing the uniform feed of such dry barium carbonate through mechanical and electrical dispensing and weighing devices. Again the gravity flow of such dry barium carbonate in feeder or storage hoppers has not been dependable, due to the "bridging" or "hanging" tendency thereof which caused the same to cling to the sides of the container and cause almost a complete stoppage of the feed.

My investigations have led to the discovery that the foregoing disadvantages of precipitated barium carbonate can be substantially entirely eliminated and a decidedly free-flowing characteristic can be imparted thereto by subjecting the same to a limited or slight calcining action in the manner hereinafter described.

In carrying out my invention, I preferably proceed as follows:

Dry precipitated barium carbonate, preferably of 300 mesh is continuously conveyed in a thin layer through a gas-fired inclined rotary kiln, such for example as the ordinary cement kiln, wherein it is subjected to a calcining temperature desirably from about 400° C. to 450° C. for a relatively short time say 30 minutes of total exposure to the calcining gases and which period is only sufficient to effect a slight calcination or nodulizing of such precipitated carbonate.

In the accompanying drawing, I have illustrated diagrammatically a typical rotary kiln suitable for use in the calcining of barium carbonate in accordance with my invention.

Referring to the drawing, the reference numeral 1 designates an inclined cylindrical rotary kiln of the type commonly used in the cement industry and 2 the gas inlet tuyères for supplying gaseous fuel thereto at the lower end thereof. The barium carbonate to be calcined is gradually fed into the fired kiln during rotation thereof through the aperture 3 at the upper end thereof and the same travels downwardly and along the inner surface of the kiln in a thin sheet or layer and in a direction counter to that of the waste flue gases, which preferably constitute the type of fuel employed for such calcination.

A simple yet reliable test of the free-flowing characteristics of dry precipitated barium carbonate comprises the depositing of a test sample of 50 grams on a 30 mesh screen of eight inches diameter and uniformly tapping the same with a rod or other implement in such a manner and with such an intensity that, in the case of dry uncalcined precipitated barium carbonate, the test sample thereof requires approximately 110 similar, uniformly delivered taps to cause substantially all of the test sample to pass through the screen. In the following table the comparative flow characteristics when so tested of dry uncalcined precipitated barium carbonate of the aforesaid degree of fineness and the same barium carbonate calcined at different temperatures, but each for equal firing intervals, namely approximately 30 minutes, are illustrated.

|  | Taps |
|---|---|
| Uncalcined | 110 |
| Calcined @ 250 to 300° C. | 75 |
| Calcined @ 300 to 350° C. | 50 |
| Calcined @ 350 to 400° C. | 30 |
| Calcined @ 400 to 450° C. | 12 |

While barium carbonate precipitated by different processes and under varying conditions will vary somewhat, before calcination, in their free-flowing properties as disclosed by the above method of testing, practically none of such uncalcined barium carbonate will show a free-flowing characteristic when subjected to the above test that is equivalent to less than 75 taps, yet on calcination, in the manner herein described, and particularly at temperatures from 400° C. to 450° C., they will show a free-flowing characteristic equivalent to only 12 taps.

The precipitated barium carbonate employed should be of a particle size which represents a degree of fineness of less than 300 mesh, and preferably comprises a barium carbonate having a particle size of about 0.444 micron and a specific surface in excess of 3.145 meters per gram such as disclosed, for example, in my prior Patents Nos. 1,634,338 and 2,191,411.

The temperature maintained in the kiln must be sufficient to effect the limited calcination to such an extent as to produce a product capable of passing the above test but in no event should the temperature of the barium carbonate when discharged from the kiln be less than 300° C. and in excess of 550° C.

Wherever herein reference is made to mesh fineness of the particles of precipitated barium carbonate, the same is to be understood as applying to the degree of fineness under wet washing conditions as distinguished from dry sieving.

The precipitated barium carbonate employed, even though it is in an extremely finely divided condition (less than 300 mesh), will nevertheless, prior to the hereindescribed calcination treatment, offer considerable resistance to screening through a screen of but 30 mesh due to its sticky nature which tends to cause the particles to clump together or ball up on the screen and which balls when so formed will not readily disintegrate. The calcination treatment as hereindescribed substantially entirely eliminates the tendency of the particles of the precipitated barium carbonate so treated to stick together or agglomerate and as a consequence the same may be readily screened through a 30 mesh screen as evidenced by the character of the test which the same are required to pass. While the calcination treatment does result in some growth in particle size, nevertheless these calcined particles will still wash almost completely through a 300 mesh screen.

Various changes within the scope of the appended claims may be made without departing from the spirit of my invention.

Having thus described my invention, what I claim and desire to obtain by United States Letters Patent is:

1. The method of making a free-flowing precipitated barium carbonate, which comprises subjecting normal precipitated barium carbonate of less than 300 mesh fineness, while in the form of a thin layer, to a calcining temperature between 300° C. and 550° C. for a relatively short interval of time to effect but a limited calcination of the same without objectionable increase of the particle size thereof, such interval of time and the temperature employed being such that if a test sample of 50 grams of the calcined product is deposited on a 30 mesh screen of 8 inches diameter it will require less than half the number of taps of a given intensity uniformly delivered thereto with a rod, to cause substantially all of said sample to pass through said screen as compared with the number of similar taps, delivered with the same intensity by the same rod, which is required to cause substantially all of a sample of the same weight of barium carbonate of the same quality as that so calcined, but prior to calcination thereof to pass through such screen; and then recovering the resultant calcined product.

2. The method of making a free-flowing precipitated barium carbonate, which comprises subjecting normal barium carbonate of less than 300 mesh fineness, while in the form of a thin layer, to a calcining temperature between 300° C. and 400° C. for a relatively short interval of time and not exceeding 30 minutes to effect but a limited calcination of the same without objectionable increase of the particle size thereof, such interval of time and the temperature employed being such that if a test sample of 50 grams of the calcined product is deposited on a 30 mesh screen of 8 inches diameter it will require less than one-third the number of taps of a given intensity, uniformly delivered thereto with a rod, to cause substantially all of said sample to pass through said screen as compared with the number of similar taps delivered with the same intensity by the same rod, which is required to cause substantially all of a sample of the same weight of barium carbonate of the same quality as that so calcined, but prior to calcination thereof, to pass through such screen; and then recovering the resultant calcined product.

3. The method of making a free-flowing precipitated barium carbonate, which comprises in bringing normal precipitated barium carbonate of less than 300 mesh fineness, while in the form of a thin layer, to a calcining temperature of between 300° and 500° C. for a sufficient interval of time in order to effect but a limited calcination of the same without objectionable increase of the particle size thereof, such interval of time and the temperature employed being such that if a test sample of 50 grams of the calcined product is deposited on a 30 mesh screen of 8 inches diameter it will require less than one-fifth the number of taps of a given intensity, uniformly delivered thereto with a rod, to cause substantially all of said sample to pass through said screen as compared with the number of similar taps delivered with the same intensity by the same rod, which is required to cause substantially all of a sample of the same weight of barium carbonate of the same quality as that so calcined, but prior to calcination thereof, to pass through such screen; and then recovering the resultant calcined product.

4. The method of making a free-flowing precipitated barium carbonate, which comprises subjecting normal precipitated barium carbonate of less than 300 mesh fineness, while in the form of a thin layer, to a calcining temperature between 400° C. and 450° C. for a relatively short interval of time and not exceeding 45 minutes in order to effect but a limited calcination of the same without objectionable increase of the particle size thereof, such interval of time and the temperature employed being such that if a test sample of 50 grams of the calcined product is deposited on a 30 mesh screen of 8 inches diameter it will require less than one-fifth the number of taps of a given intensity, uniformly delivered thereto with a rod, to cause substantially all of said sample to pass through said screen as compared with the number of similar taps delivered with the same intensity by the same rod, which is required to cause substantially all of a sample of the same weight of barium carbonate of the same quality as that so calcined, but prior to calcination thereof, to pass through such screen; and then recovering the resultant calcined product.

5. A precipitated barium carbonate, the particles of which are partially calcined, said product being free-flowing to such a degree that when a five-gram sample thereof is placed on an eight inch diameter screen of 30 mesh and subjected to a uniform succession of tappings, the entire sample will pass substantially completely through such screen after being subjected to less than 30 such tappings, and where the manner of delivering such tappings and the intensity thereof are such as to cause a sample of similar size of an untreated barium carbonate of a similar degree of fineness or even greater degree of fineness when placed on a similar screen to substantialy pass completely therethrough only after it has been subjected to 75 such tappings.

6. A precipitated barium carbonate, the particles of which are partially calcined, said product being free-flowing to such a degree that when a 50 gram sample thereof is placed on an eight inch diameter screen of 30 mesh and subjected to a uniform succession of tappings, the entire sample will pass substantially completely through such screen after being subjected to less than 20 such tappings, and where the manner of delivering such tappings and the intensity thereof are such as to cause a sample of similar size of an untreated barium carbonate, whose particle size is at least twice as small as that of such partially calcined barium carbonate when placed on a similar screen to substantially pass completely therethrough only after it has been subjected to 75 such tappings.

7. A precipitated barium carbonate, the particles of which are partially calcined, said product being free-flowing to such a degree that when a 50 gram sample thereof is placed on an eight inch diameter screen of 30 mesh and subjected to a uniform succession of tappings, the entire sample will pass substantially completely through such screen after being subjected to less than 15 such tappings, and where the manner of delivering such tappings and the intensity thereof are such to cause a sample of a similar size of an untreated barium carbonate, whose particle size is at least twice as small as that of such partially calcined barium carbonate when placed on a similar screen to substantially pass completely therethrough only after it has been subjected to 75 such tappings.

JAMES B. PIERCE, Jr.